United States Patent
Terasaki

(10) Patent No.: US 10,270,767 B2
(45) Date of Patent: Apr. 23, 2019

(54) METHOD FOR CERTIFYING THE IDENTITY OF A USER USING AN IDENTIFICATION SERVER

(71) Applicant: Orange, Paris (FR)

(72) Inventor: Shinya Terasaki, Tokyo (JP)

(73) Assignee: ORANGE, Paris (FR)

( * ) Notice: Subject to any disclaimer, the term of this patent is extended or adjusted under 35 U.S.C. 154(b) by 214 days.

(21) Appl. No.: 15/130,015

(22) Filed: Apr. 15, 2016

(65) Prior Publication Data

US 2016/0308860 A1 Oct. 20, 2016

(30) Foreign Application Priority Data

Apr. 15, 2015 (EP) .................................. 15305564

(51) Int. Cl.
*H04L 29/06* (2006.01)
*H04W 12/06* (2009.01)
(Continued)

(52) U.S. Cl.
CPC .... *H04L 63/0869* (2013.01); *G06F 17/30867* (2013.01); *G06K 19/06037* (2013.01);
(Continued)

(58) Field of Classification Search
CPC ............ H04L 63/0869; H04L 63/0838; H04L 63/0876; H04W 4/12; H04W 12/06;
(Continued)

(56) References Cited

U.S. PATENT DOCUMENTS 6,868,391 B1 * 3/2005 Hultgren ................ G06Q 20/02
379/145
2013/0066783 A1 3/2013 Wolff
(Continued)

FOREIGN PATENT DOCUMENTS

| EP | 2128809 A1 | 12/2009 |
|---|---|---|
| WO | 2009157003 A1 | 12/2009 |
| WO | 2011147566 A2 | 12/2011 |

OTHER PUBLICATIONS

European Search Report and Written Opinion dated Jul. 31, 2015 for corresponding European Application No. 15305564, filed Apr. 15, 2015.

*Primary Examiner* — Yogesh Paliwal
(74) *Attorney, Agent, or Firm* — David D. Brush; Westman, Champlin & Koehler, P.A.

(57) ABSTRACT

A method, program and server are provided for certifying an identity of a second user using an identification server. The method includes: receiving, by the identification server, from a first device belonging to a first user, identification data regarding the second user; comparing, by the identification server, the identification data with certified identities contained in an identity database of the identification server; processing in which, when the identification data received is determined by the identification server to match a certified identity of the identity database, the identification server retrieves information regarding a third device belonging to a person corresponding to said certified identity, said information regarding the third device being stored in the identity database; and generating, by identification server, an identification code and sending said identification code to both the first device and the third device.

12 Claims, 3 Drawing Sheets

(51) Int. Cl.
*G06F 17/30* (2006.01)
*G06K 19/06* (2006.01)
*G06Q 10/02* (2012.01)
*H04W 4/12* (2009.01)

(52) U.S. Cl.
CPC ......... *G06Q 10/02* (2013.01); *H04L 63/0838* (2013.01); *H04W 4/12* (2013.01); *H04W 12/06* (2013.01)

(58) Field of Classification Search
CPC . H04W 12/08; H04W 76/02; G06F 17/30867; G06K 19/06037; G06Q 10/02
USPC .......................................................... 726/3
See application file for complete search history.

(56) References Cited

U.S. PATENT DOCUMENTS

2013/0254396 A1* 9/2013 Robertson ............... H04L 41/50
 709/225
2015/0019433 A1* 1/2015 Leger .................. G06Q 20/085
 705/44

* cited by examiner

METHOD FOR CERTIFYING THE IDENTITY OF A USER USING AN IDENTIFICATION SERVER

CROSS-REFERENCE TO RELATED APPLICATIONS

This Application is claims priority to and the benefit of European Patent Application No. 15305564.5, filed Apr. 15, 2015, the content of which is incorporated herein by reference in its entirety.

FIELD OF THE DISCLOSURE

The present disclosure relates to the identity authentication by a first user of a second user using an identification server.

BACKGROUND OF THE DISCLOSURE

In many circumstances, for instance in the case of a booking of a taxi or of a tour guide, the person that is interested in being provided with a service does not generally know the person who appears to provide the service, if that person does have the required credentials to provide the service, if the person is properly registered with the associated booking system through which the booking was made, and so on.

There is therefore the need for a way for the intended user to assert the identity of the person willing to provide the service.

A way of asserting the identity of users in a similar scenario is for instance described in US 2013/0254396 A1. This document discloses an identification method in which a first user must browse profiles of users of an online platform and select a second user with whom he is willing to meet. The second user must then accept an invitation sent to him on the online platform by the first user, in which case identification information of both users may be sent to the first and second users so that they may be able to recognize one another when they meet.

Such a method presents drawbacks. In fact, this method requires that the second user be first chosen within a list of potential users. In addition, the second user has to accept an invitation on the platform from the first user.

These steps tend to render the above method tedious and lengthy. This method is in particular poorly adapted to configurations in which the users are currently meeting in person.

SUMMARY

An exemplary aspect of the present disclosure relates to a method for certifying the identity of a user offering a service using an identification server, the method comprising:
- a reception step in which the identification server receives, from a first device belonging to a first user, identification data regarding a second user who corresponds to the user offering a service,
- a comparison step in which the identification server compares the identification data with certified identities contained in an identity database of the identification server,
- a processing step in which, when the identification data received is determined by the identification server to match a certified identity of the identity database, the identification server retrieves information regarding a third device belonging to a person corresponding to said certified identity, said information regarding the third device being stored in the identity database, and
- a generation step in which the identification server generates an identification code adapted to confirm the identity of the second user and sends said identification code to both the first device and the third device.

According to another aspect of the disclosure, the identification code is sent to the third device using a Short Message Service text message.

According to another aspect of the disclosure, in the processing step, if the identification data is not determined to match any certified identity in the identity database, the identification server generates a notification having a content and/or a format different from that of the identification code.

According to another aspect of the disclosure, the method further comprises a verification step in which the first user verifies that the second user has received an identification code on a second device belonging to said second user and if so, that the identification code received by the second user on the second device corresponds to the identification code received on the first device, in which case the second device corresponds to the third device.

According to another aspect of the disclosure, the identification data is obtained by the first device using an image acquisition module of the first device.

According to another aspect of the disclosure, the identification data is obtained by taking a picture of an identity document of the second user using the first device.

According to another aspect of the disclosure, the identification data is displayed on a second device belonging to the second user and is obtained using the image acquisition module of the first device.

According to another aspect of the disclosure, the identification data is displayed as a barcode on the second device.

According to another aspect of the disclosure, the second device contains a mobile application adapted to generate the barcode and cause the second device to display the barcode.

According to another aspect of the disclosure, the identification data is obtained by the first device from the second device using a wireless communication technology.

According to another aspect of the disclosure, the first device contains a mobile application adapted to communicate with the identification server and the identification data is obtained by the first device and sent to the identification server using said mobile application contained in the first device.

Furthermore, the disclosure relates to a computer program comprising instructions for implementing the method defined above, when the computer program is executed by a processor.

The disclosure also relates to an identification server for use in a method for certifying the identity of a second user using said identification server as defined above, the identification server comprising:
- a communication module adapted to receive identification data regarding the second user from a first device,
- an identity database containing certified identities and for each certified identity, information regarding a device belonging to a person corresponding to said certified identity,
- a computing unit configured to determine whether the identification data received by the communication module matches a certified identity in the identity database and to generate an identification code adapted to confirm the identity of the second user when a match is found between the identification data and a certified identity in the identity database,
the communication module being further configured to send said identification code to both the first device and the device belonging to the person corresponding to the certified identity matching the identification data.

BRIEF DESCRIPTION OF THE DRAWINGS

Further features and advantages will become more apparent by reading the following detailed description of the embodiments, which are given by way of non-limiting examples with reference to the appended drawings, in which.

DETAILED DESCRIPTION OF ILLUSTRATIVE EMBODIMENTS

Figure 1:
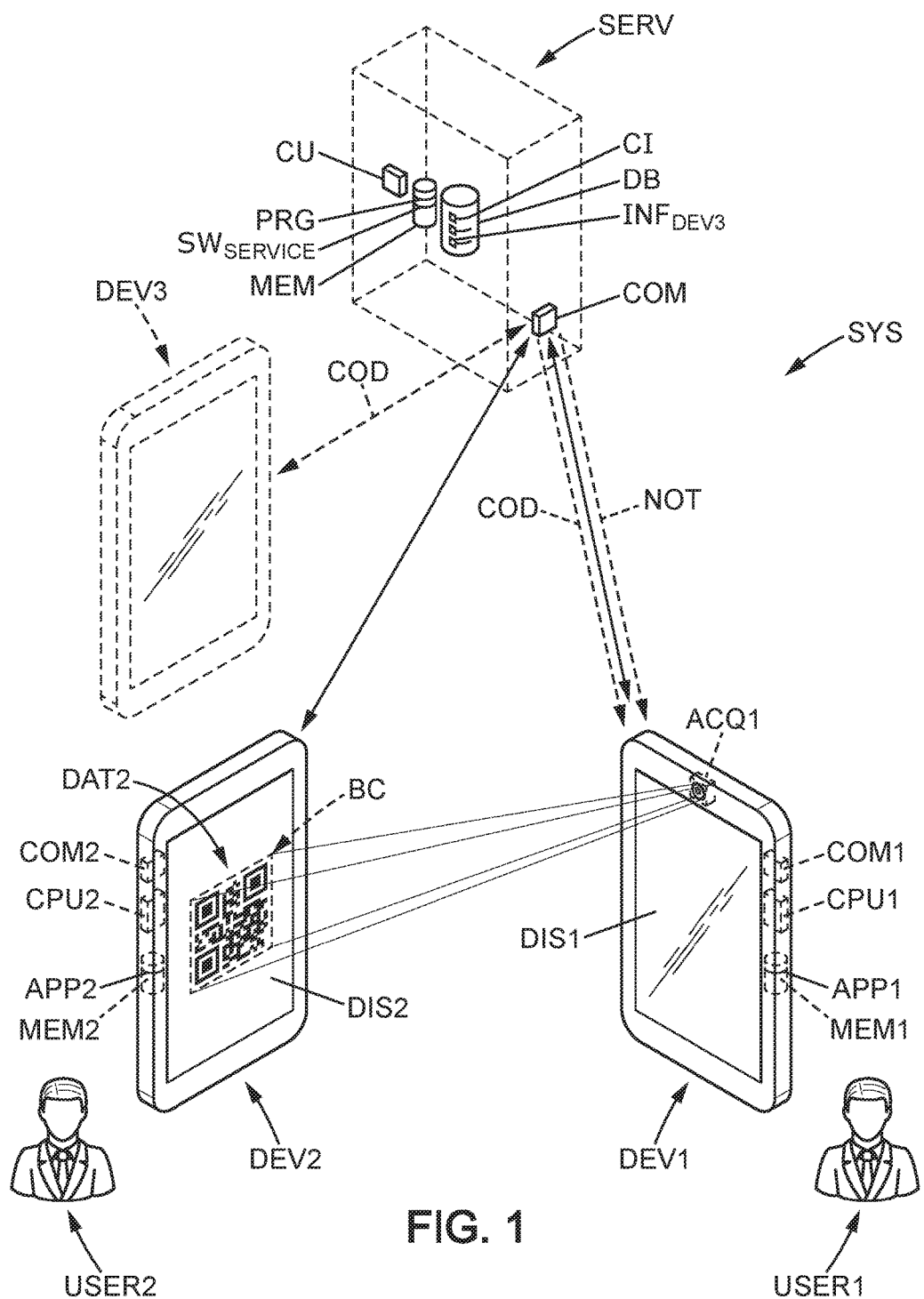
FIG. 1 illustrates an identification apparatus used in a method for certifying the identity of a person according to an aspect of the disclosure.

FIG. 1 illustrates an identification system SYS adapted for providing to a first user USER1 a way of certifying the identity of a second user USER2.

In the description that follows, the terms "first", "second" and "third" are not used in a limiting manner but merely serve to clearly differentiate the elements of the disclosure from one another.

In addition, the term "user" refers to a person. That person may optionally also be a user of an online service, in which case "user" also refers to the person as being a user of the service. For instance, such an online service may be a booking platform, such a taxi booking platform, a tour guide booking platform, and so on.

The service is designed to favor the connection of users willing to obtain a service with users willing to provide the corresponding service. For instance, a taxi booking platform connects people willing to use a taxi with taxi drivers who seek clients.

In a known manner, the service may be implemented through the execution by a processing unit of one or more software(s) $SW_{SERVICE}$ contained in the memory of a server.

In the example of FIG. 1, the software $SW_{SERVICE}$ is depicted as contained in a memory MEM of a server SERV of the system SYS described in more details below. However, in other embodiments, the software is located in a different server and executed by this different server.

In the context of an aspect of the disclosure, the first user USER1 may optionally be a registered user of the online service, such a registration being carried out in a known manner. In addition, in the example scenario of FIG. 1, the first user USER1 has booked a reservation using the service. The second user USER2 presents himself to the first user USER1 as having been appointed by the online service through which the first user USER1 made a booking to provide the first user USER1 with the desired service.

In such a scenario, one of the purposes of an aspect of the disclosure is to provide the first user USER1 with an improved way to determine if the second user USER2 is in fact a registered user of the service, and is therefore trustworthy.

The system SYS comprises a first device DEV1 belonging to the first user USER1, a second device DEV2 belonging the second user USER2, and an identification server SERV.

The first and second devices DEV1, DEV2 may be mobile devices. More precisely, they are computing devices small enough to be handheld, such as mobile computers, smartphones, smartwatches, head-mounted displays, digital cameras, personal navigation devices, and so on.

In the example description below, both devices are smartphones.

The first device DEV1 comprises a display DIS1, an image acquisition module ACQ1 such as a charge-coupled device (CCD), a communication module COM1 adapted to communicate with the server SERV (for instance using a network, Internet, etc.), a processing unit CPU1 and a memory MEM1.

The processing unit CPU1 is configured to run programs contained in the memory MEM1 to operate the first device DEV1 and its components. The memory MEM1 further contains a mobile application APP1. The mobile application APP1 is adapted to manage the communication module COM1 in order for the mobile application APP1 and the server SERV to communicate together. The application APP1 is for instance adapted to send requests to the server SERV containing identification data DAT2 regarding the second user.

For instance, the mobile application APP1 has been made available by the authority running the service implemented through the execution of the software $SW_{SERVICE}$ and has been downloaded on the first device DEV1 by the first user USER1.

The second device DEV2 contains a display DIS2, a communication module COM2 adapted to communicate with the server SERV (for instance using a network, Internet, etc.), a processing unit CPU2 and a memory MEM2.

The processing unit CPU2 is configured to run programs contained in the memory MEM2 to operate the second device DEV2 and its components.

In the embodiment of FIG. 1, the memory MEM2 further contains a mobile application APP2.

The mobile application APP2 is further adapted to generate identification data DAT2 regarding the second user USER2 and display the identification data DAT2 using the display DIS2 of the second device DEV2. The identification data DAT2 is for instance generated as a barcode BC encoding the identification data DAT2 regarding the second user USER2. The barcode BC is for instance in the form of a two-dimension barcode. The bardcode is for instance a QR code, a datamatrix code, etc.

For instance, the identification data DAT2 contains a name, a pseudonym, an address and/or any information which may serve to identify the second user USER2.

In some embodiments, the mobile application APP2 has been made available by the authority running the service through which the users USER1 and USER2 have come in contact, and has been downloaded on the second device DEV2 by the second user USER2.

However, in some embodiments, the mobile application APP2 may be separate from the service, and is for instance a mobile application whose primary function is to generate the information data DAT2 regardless of whether the user USER2 is a registered user of the service implemented by the software $SW_{SERVICE}$.

The server SERV comprises a communication module COM adapted to communicate with the communication modules COM1, COM2 of the first and second devices DEV1, DEV2. The server SERV further comprises a computing unit CU, an identity database DB and a memory MEM.

The computing unit CU is configured to run programs contained in the memory MEM so as to operate the server SERV and its components.

The identity database DB contains certified identities CI of users of the service. For each certified identity CI, the database DB further contains information $INF_{DEV3}$ regarding a device DEV3 belonging to the person corresponding to the certified identity CI.

Each certified identity CI is for instance added to the database DB upon registration to the service by a new user. Such registration by a new user requires for instance that the user provide a name, a photograph, an address and such. In particular, to complete the registration, a new user provides the information $INF_{DEV3}$ identifying a device DEV3 belonging to him/her and to which the service may send text messages, emails and such. The information $INF_{DEV3}$ is then associated with the certified identity CI which is created in the database upon completion of the registration by the new user.

The information $INF_{DEV3}$ preferably comprises of a phone number which identifies the device DEV3. The phone number more specifically identifies a SIM card or any equivalent card inserted in the device DEV3 for its operation and therefore identifies the device DEV3. In case clones of the SIM card or the device exist, the clones may be identified as such and disabled. In other words, the information $INF_{DEV3}$ identifies a single device DEV3 belonging the person corresponding to the certified identity CI.

The device DEV3 is for instance a mobile device similar to the first device DEV1 and/or the second device DEV2.

In the example of FIG. 1, the identity database DB has been depicted as being separate from the memory MEM, and is for instance contained in a memory (not shown) different from the memory MEM. However, in some embodiments, the identity database DB is located in the memory MEM.

Figure 2:
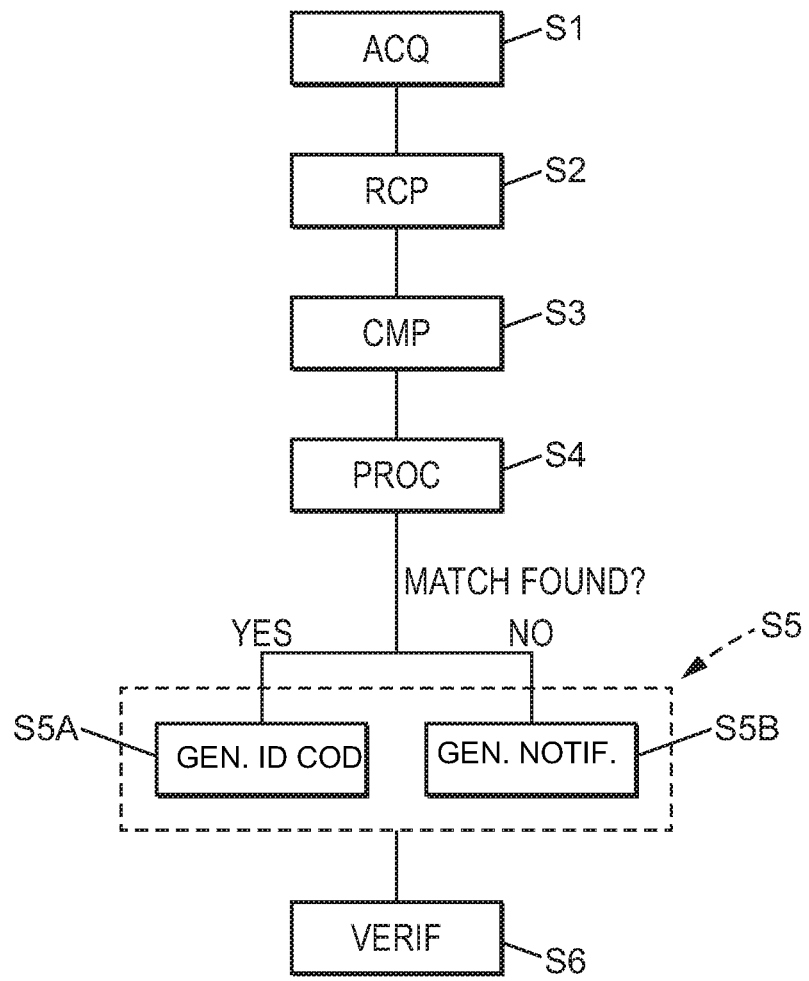
FIG. 2 illustrates a method for certifying the identity of a user using an identification server according to an aspect of the disclosure.

The method according to an aspect of the disclosure for certifying the identity of the second user USER2 to the first user USER1 using the identification server SERV will now be described in reference to FIGS. 1 and 2.

During an acquisition step S1, the identification data DAT2 regarding the second user USER2 is generated by the processing unit CPU2 of the second device DEV2 through the mobile application APP2 and displayed on the display DIS2 as the barcode BC. The first user USER1 then retrieves the identification data DAT2 using the first device DEV1. To that end, the first user USER1 acquires the barcode BC displayed on the second device DEV2 using the image acquisition module ACQ1. The image of the barcode so-acquired by the first device DEV1 is processed by the processing unit CPU1 and the identification data DAT2 is stored in the memory MEM1.

During a reception step S2, the identification data DAT2 acquired by the first device DEV1 is sent to the server SERV using the communication module COM1 of the first device DEV1. The identification data DAT2 is for instance sent in the form of one or more requests containing the identification data DAT2. The identification data DAT2 is then received by the server SERV and is stored in its memory MEM.

The reception step S2 is for instance triggered by the server SERV in response to a communication request sent to the server SERV by the first device DEV1.

During a comparison step S3, the computing unit CU compares the identification data DAT2 received during the reception step S2 to the certified identities CI contained in the identity database DB.

The comparison step S3 is followed by a processing step S4.

In the processing step S4, if the identification data DAT2 is determined to match a certified identity CI of the database DB, the computing unit CU retrieves the information $INF_{DEV3}$ regarding the device DEV3 associated with the person corresponding to the certified identity CI and then moves on to step S5A.

If the identity information DAT2 is not determined to match any certified identity CI in the identity database DB, a next step S5B detailed below is carried out.

Steps S5A and S5B form a generation step S5.

In step S5A, the computing unit CU generates an identification code COD. The identification code is adapted to confirm the identity of the second user. The identification code COD is then sent by the communication module COM of the server SERV to both the first device DEV1 and the third device DEV3 corresponding to the device identified by the information $INF_{DEV3}$ of the certified identity CI which has been determined to match the identification data DAT2 in the previous step.

The identification code COD may consist of a combination of alphanumerical symbols. For instance, the identification code COD is a number having several digits. The identification code COD is for instance a pseudo-random number generated according to any known method.

Preferably, the identification code COD is a one-time-code, i.e. an identification code generated at a given time for a given user USER1 will be different from an identification code generated at another time for the same user USER1.

Preferably, the identification code COD is sent to the third device using a Short Message Service (SMS) text message. In some embodiments, the identification code COD is also sent to the first device DEV1 using a SMS text message. In these embodiments, preferably, the identification code COD is sent by the server SERV to no other device besides the first and third devices DEV3.

However, the identification code COD may be sent to the first device DEV1 through a delivery mechanism different from an SMS text-message. For instance, the identification code DEV1 may be delivered to the first device DEV1 of the first user USER1 with an e-mail. Alternatively, the identification code COD may be sent to the first device DEV1 by the server SERV using the IP transaction established between them.

These aspects, and in particular the feature according to which the identification code COD is sent to the third device DEV3 using an SMS text message, minimize the risks that the identification code COD is made available on a plurality of devices besides the first device DEV1. In fact, the SMS delivery system is secure enough to ensure the delivery of the text message to a single device. This increases the safety and the reliability of the method.

In the alternative step S5B, the computing unit CU generates a notification NOT (FIG. 1). The notification NOT is then sent to the first device DEV1 by the server SERV.

The notification NOT contains information representing the fact that the identification data DAT2 does not correspond to any certified identity in the identity database DB.

Preferably, the notification NOT has a content and/or a format which differs from that of the identification code COD that the server SERV generates in step S5A when the identification data DAT2 has been determined to match a certified identity CI in the database DB.

For instance, the notification NOT contains a warning explaining that the second user USER2 is not a registered user of the service. In addition, the notification NOT is displayed in a color and/or in a font different from that of an identification code COD. As an example, the notification NOT is displayed in red, bold and underlined characters, whereas an identification code is displayed in plain black characters.

During a verification step S6, the first user USER1 determines whether an identification code COD or a notification NOT has been received on the first device DEV1.

If the first device DEV1 has received an identification code COD, he consults the second user USER2 to see if the latter has also received an identification code COD on the second device DEV2.

If the second user USER2 has received an identification code COD, the first user USER1 compares his identification code COD with the one received by the second user USER2.

If the identification codes received by the first and second users USER1, USER2 are identical, the first user USER1 has the confirmation that the second user USER2 corresponds to the person whose certified identity CI has been determined to match the identification data DAT2 sent via the first device DEV1. Therefore, the second user USER2 is trustworthy.

In this situation, the third device DEV3 corresponds to the second device DEV2.

However:
- if the second user USER2 has not received an identification code COD,
- if the second user USER2 has received an identification code COD on the second device DEV2 but this code does not match the identification code COD received on the first device DEV1, or
- if the first user USER1 has received a notification NOT saying that no match has been found in the identification database DB, then the first user USER1 can deduce that the second user USER2 is not appointed by the service.

In this situation, the second device DEV2 and the third device DEV3 are not a same device.

In the embodiment above, the identification data DAT2 has been described as obtained by the first device DEV1 through the generation of a barcode using the second device DEV2. However, in other embodiments, the identification data DAT2 may be obtained in a different manner.

Figure 3:
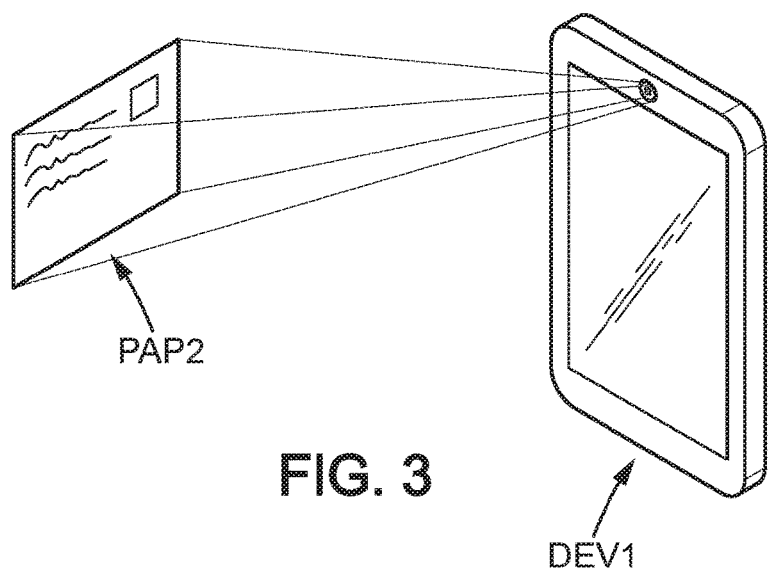
FIGS. 3 and 4 illustrate alternative steps of the method of FIG. 2.

In reference to FIG. 3, in another embodiment, the identification data DAT2 is obtained using the image acquisition module ACQ1 by capturing an image of an identification paper PAP2 belonging to the second user USER2. The identification data DAT2 is displayed on the identification paper PAP2. The image of the identification paper PAP2 is then stored in the memory MEM1 of the first device DEV1.

The identification paper PAP2 may be an official identity card, a passport, or any suitable paper-like document. In particular, it may be a document issued by the authority running the service to the users of the service once they have completed their registration. The identification paper PAP2 may for instance be in the form of a sticker located on a car.

In the reception step S2, the identification data DAT2 is sent to the server SERV using any known method. For instance, the identification data DAT2 is uploaded to the server SERV in the form of the acquired image. For instance, the upload of the captured image encoding the identification data DAT2 is carried out via an-email sent to the server SERV and to which the image is attached. Alternatively, the image may be sent using Web Browser which implements a POST request method through which a request enclosing the image is sent to the server SERV. In other embodiments, the image is uploaded to the server SERV using an REST-based (for Representational State Transfer) Application Programming Interface.

Figure 4:
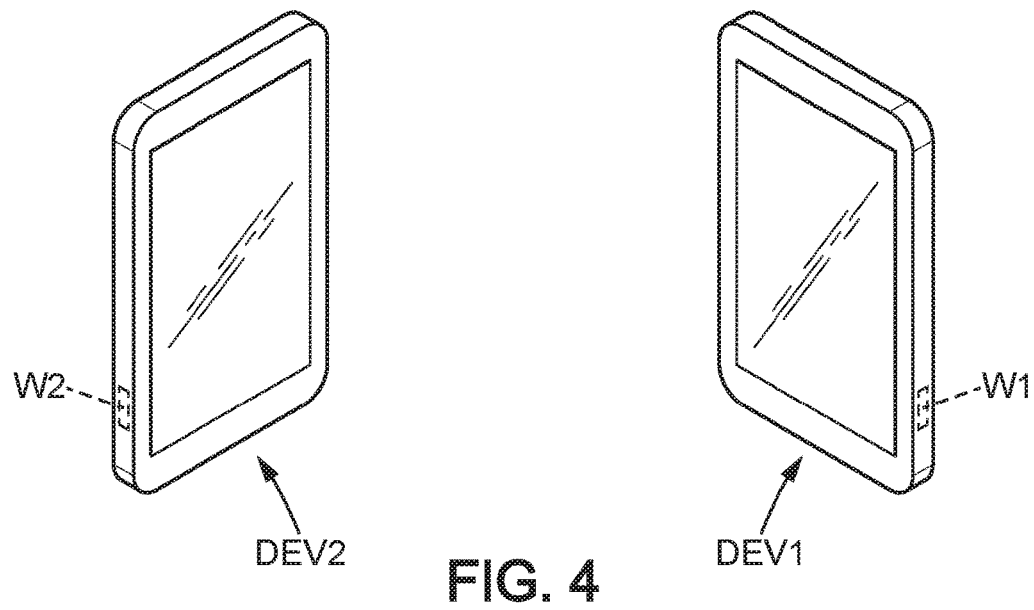

In another embodiment illustrated in FIG. 4, the identification data DAT2 is sent to the first device DEV1 using a wireless communication technology. This technology may be a Near Field Communication (NFC) technology, a Bluetooth technology, or any suitable wireless technology.

In this embodiment, the devices DEV1 and DEV2 comprise a wireless communication module W1, respectively W2 (in addition to the elements previously described above). The identification data DAT2 is then sent by the second device DEV2 to the first device DEV1 via the wireless communication modules W1, W2, for instance by moving the devices DEV1, DEV2 closer together.

In the context of an aspect of the disclosure, in a general manner, the identification data DAT2 is acquired by the first device DEV1 in an encoded form. In order to be compared with the data contained in the database DB, the data DAT2 is decoded after being acquired. The decoding of the identification data DAT2 may be carried out by the first device DEV1 itself, or by the server SERV, or by any intermediary equipment through which the communications between the first device DEV1 and the server SERV are setup. The type of decoding employed depends on how the first device DEV1 acquires the identification data DAT2. For instance, when the identification data DAT2 are acquired through the image acquisition module ACQ, the decoding involves an image processing method. When exchanged through the modules W1, W2, the decoding does not involve an image processing method.

For instance, when in their encoded form, the identification data DAT2 correspond to a logical ID. Once decoded, they correspond to a user ID which is usable by the server SERV for its comparison with the certified identities CI of the database DB.

In some embodiments, steps S2 through S5 are the result of the execution by the computing unit CU of a computer program PRG (FIG. 1) located in the memory of the server SERV. Therefore, an aspect of the disclosure is also such a computer program PRG.

Furthermore, the description above has been given for a configuration in which the first device DEV1 comprises a mobile application APP1 which manages the interaction of the first device DEV1 with the server SERV. However, in other embodiments, the first device DEV1 does not contain such an application.

In this embodiment, the sending of the identification data DAT2 may be carried out using an online platform of the service accessed through an Internet page, for instance using a Web browsing application displayed on the first device DEV1.

In addition, as indicated above, the first user USER1 does not need to be a registered user of the service to which the identification server SERV pertains. For instance, communications between the first device DEV1 and the server SERV are made possible even when the first user USER1 is not registered. The communications between the device DEV1 and the server SERV are then managed using the application APP1, or using the online platform of the service.

Moreover, as made obvious in view of the description above, the only case in which one of the users has to be registered is when the second user USER2 is in fact a user acknowledged by the service, in which case he corresponds to a certified identity CI in the identity database DB.

Furthermore, in some embodiments in which both the first and second devices DEV1, DEV2 contain a mobile application APP1, APP2, these mobile applications may be a same application. In such embodiments, the barcode BC is for instance generated through a first function of the application, and the sending of the information data DAT2 acquired by the first device DEV1 corresponds to another functionality of the application. However, in other embodiments, as described above, they may be different applications.

The description above has been given in view of an example situation in which the first user USER1 has booked a service using the service provided by the software $SW_{SERVICE}$. However, an aspect of the disclosure is adapted to many situations, for instance to situations in which the first user USER1 is spontaneously approached by a second user USER2 who presents himself as registered user of a service platform such as the service made available through the software $SW_{SERVICE}$ and is available for providing the first user USER1 with a service, such as a taxi fare or a guide tour.

In addition, in the embodiment above, the method is carried out using a single identification server SERV. However, in other embodiments, the identification server SERV is a server entity which may comprise more than one identification server SERV which are involved in the method according to an aspect of the disclosure.

The method according to an aspect of the disclosure has numerous advantages.

First of all, it is convenient to carry out as it allows the user USER1 to determine whether the second user USER2 has been appointed by the service. In addition, it gives results without requiring that the users USER1 and USER2 perform a preliminary action. In particular, it does not require that the users USER1 and USER2 identify each other over an online platform, then send each other a request which must be validated by the users before they are sent identification information regarding the other user.

In addition, the fact that the identification code is sent through a SMS text message reduces the likelihood of falsifications occurring in the process, thereby increasing the overall security and reliability of the method.

Moreover, the use of a barcode as a means of providing the first user USER1 with the identification data translates into a limited amount of information shared by the second user USER2 with the first user USER1, thereby safekeeping the privacy of the second user USER2.

An exemplary embodiment of the present disclosure provides a method of certifying the identity of a second user by a first user, which is much more convenient to carry out, and which in particular is adapted to situations in which the first user and the second user meet are meeting in person without having been in contact beforehand.

Although the present disclosure has been described with reference to one or more examples, workers skilled in the art will recognize that changes may be made in form and detail without departing from the scope of the disclosure and/or the appended claims.

The invention claimed is:

1. A method for certifying an identity of a user offering a service, said method comprising:
   a booking act in which a first user books the service through a first device, said first device belonging to the first user;
   a reception act in which an identification server receives, from the first device, identification data regarding a second user,
   a comparison act in which the identification server compares the identification data regarding the second user with certified identities contained in an identity database of the identification server,
   a processing act in which, when the identification data regarding the second user received is determined by the identification server to match a certified identity of the identity database, the identification server retrieves information regarding a third device belonging to a third person corresponding to said certified identity of the user offering the service, said information regarding the third device being stored in the identity database, and
   a generation act in which the identification server generates an identification code adapted to confirm the identity of the second user and sends said identification code to both the first device and the third device;
   a verification act in which the first user verifies that the second user has received an identification code on a second device belonging to said second user and if so, that the identification code received by the second user on the second device corresponds to the identification code received on the first device, in which case the second device corresponds to the third device.

2. The method according to claim 1, wherein the identification code is sent to the third device using a Short Message Service text message.

3. The method according to claim 1, wherein in the processing act, if the identification data regarding the second user is not determined to match any certified identity in the identity database, the identification server generates a notification having at least one of a content or a format different from that of the identification code and sends said notification to the first device.

4. The method according to claim 1, further comprising obtaining the identification data regarding the second user by the first device using an image acquisition module of the first device.

5. The method according to claim 4, wherein the identification data is obtained by taking a picture of an identity document of the second user using the first device.

6. The method according to claim 4, wherein the identification data regarding the second user is displayed on a second device belonging to the second user and is obtained using the image acquisition module of the first device.

7. The method according to claim 6, further comprising displaying the identification data as a barcode on the second device.

8. The method according to claim 7, further comprising generating the barcode with a mobile application contained by the second device and causing the second device to display the barcode.

9. The method according to claim 1, further comprising obtaining the identification data regarding the second user by the first device from the second device using a wireless communication technology.

10. The method according to claim 1, wherein the first device contains a mobile application adapted to communicate with the identification server and wherein the method comprises obtaining the identification data regarding the second user by the first device and sending the identification data regarding the second user to the identification server using said mobile application contained in the first device.

11. A non-transitory computer-readable medium comprising a computer program stored thereon, comprising instructions for implementing a method of certifying an identity of a user offering a service, when the computer program is executed by a processor of an identification server, wherein the computer program configures the identification server to perform acts of:

receiving, by the identification server receives, from a first device belonging to a first user who has previously booked the service through the first device, identification data regarding the second user regarding a second user, comparing, by the identification server, identification data regarding the second user with certified identities contained in an identity database of the identification server, processing in which, when the identification data regarding the second user received is determined by the identification server to match a certified identity of the identity database, the identification server retrieves information regarding a third device belonging to a third person corresponding to said certified identity of the user offering the service, said information regarding the third device being stored in the identity database, and generating, by the identification server, an identification code adapted to confirm the identity of the second user and sending said identification code to both the first device and the third device so as to enable the first user to verify that the second user has received an identification code on a second device belonging to said second user and if so, that the identification code received by the second user on the second device corresponds to the identification code received on the first device, in which case the second device corresponds to the third device.

12. An identification server for certifying an identity of a user offering a service, the identification server comprising:

a communication module adapted to receive, from a first device belonging to a first user who has previously booked the service through the first device, identification data regarding a second user, a non-transitory computer readable medium comprising an identity database stored thereon and containing certified identities and for each certified identity, information regarding a device belonging to a person corresponding to said certified identity, a computing unit configured:

to determine whether the identification data regarding the second user received by the communication module matches a certified identity in the identity database, when a match is found between the identification data regarding the second user and a certified identity in the identity database, to retrieve information regarding a third device belonging to a third person corresponding to said certified identity of the user offering the service, said information regarding the third device being stored in the identity database, to generate an identification code adapted to confirm the identity of the second user, and to send said identification code to both the first device and the third device belonging to the person corresponding to the certified identity matching the identification data regarding the second user so as to enable the first user to verify that the second user has received an identification code on a second device belonging to said second user and if so, that the identification code received by the second user on the second device corresponds to the identification code received on the first device, in which case the second device corresponds to the third device.

* * * * *